Figure 1:
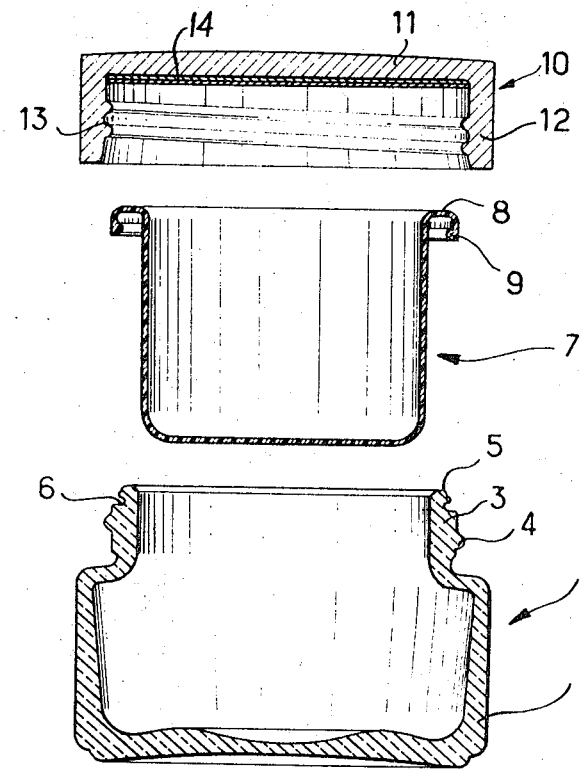

United States Patent

[11] 3,550,803

| [72] | Inventor | Pierre Pelli<br>Paris, France |
|---|---|---|
| [21] | Appl. No. | 786,194 |
| [22] | Filed | Dec. 23, 1968 |
| [45] | Patented | Dec. 29, 1970 |
| [73] | Assignee | Societe Anonyme dite: L'Oreal |
| [32] | Priority | Dec. 28, 1967 |
| [33] | | France |
| [31] | | No. 134156 |

[54] COMPOUND GLASS AND PLASTIC RECEPTACLE
4 Claims, 2 Drawing Figs.

[52] U.S. Cl....................................... 215/12,
215/40, 220/63
[51] Int. Cl....................................... B65d 11/16

[50] Field of Search........................................ 215/12, 13;
222/183; 220/63, 65, 17; 229/14

[56] References Cited
UNITED STATES PATENTS

| 2,762,381 | 9/1956 | Rainer..................... | 215/40X |
| 2,804,995 | 9/1957 | Fee.......................... | 220/63 |
| 3,189,207 | 6/1965 | Heyne et al............. | 215/12X |
| 3,311,248 | 3/1967 | Marchant................ | 215/13 |
| 3,439,827 | 4/1969 | Marland.................. | 229/14B |

Primary Examiner—Raphael H. Schwartz
Attorney—Holcombe, Wetherill & Brisebois

ABSTRACT: A receptacle for cosmetic creams and the like having volatile constituents, which receptacle comprises a glass outer container and a plastic inner container.

PATENTED DEC29 1970 3,550,803

COMPOUND GLASS AND PLASTIC RECEPTACLE

SUMMARY OF THE INVENTION

Cosmetic products such as beauty creams are now commonly packaged in thick-walled glass receptacles which hold a volume of material which is quite small in proportion to the external size of the receptacle.

This type of packaging is justified by the fact that these relatively expensive products are sold in small quantities, while the appearance and the stability of the receptacle are enhanced by using receptacles having relatively large external dimensions.

Moreover, while the external shape of such a receptacle may take various forms, the internal cavity therewithin must have a simple, preferably rounded shape, to permit easy removal of the contents.

Glass receptacles of this type cannot be produced by conventional glass-blowing processes, and are usually molded. They are consequently heavy and expensive.

Other hollow receptacles of this general type are made by assembling two halves of plastic material. These receptacles are light, but are permeable to certain constituents of the cosmetic products to be contained, which prevents their use during long periods of storage and greatly reduces their commercial employment.

The object of the present invention is to provide a new article of manufacture which consists of a receptacle which may be used to hold cosmetic products and is characterized by the fact that it comprises in combination:

a concave glass outer part which may be produced by blowing and carries at its top a neck provided with male threads;

an internal part consisting of a concave container made of plastic material, the dimensions of which permit it to be inserted within the glass part. The upper edge of this plastic inner part is provided with a substantially flat annular rim from which a cylindrical lip depends; this lip is provided with an internal peripheral flange which engages in a groove positioned above the threads on the outer surface of the end of the neck of the glass part; and a cover provided with threads meshing with those on the neck, which cover holds the aforesaid annular rim down on the end of the neck, thus closing the container.

In a particular embodiment of the invention, the end of the neck on the outer part is provided with a circular ridge against which the cover presses the annular rim of the inner part, thus assuring perfect sealing of the receptacle when the cover is screwed down. In order to overcome the permeability of the plastic cover to certain constituents of the cosmetic composition, a sheet of impermeable material, such as metallic laminated compound, may, if necessary, be positioned on the bottom of the cover so as to be gripped between the cover and the rim on the inner part.

Figure 2:
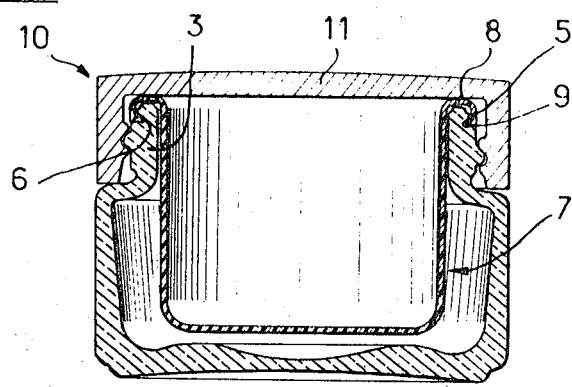

In order that the invention may be better understood, one embodiment thereof will now be described, purely by way of illustration, with reference to the accompanying drawings, in which:

FIG. 1 is an exploded axial sectional view showing the two parts constituting the receptacle plus its cover; and FIG. 2 is a sectional view showing the assembled receptacle complete with cover.

The drawings show the glass outer part 1 comprising a cylindrical portion 2, the diameter of which is substantially greater than the height, and a neck 3 provided with a male thread 4. The end of the neck 3, in a preferred embodiment of the invention, is provided with a ridge 5, while its external periphery has a groove 6.

The plastic inner part 7 is cylindrical with a rounded bottom edge, and is provided with a flat rim 8. A cylindrical lip depends from this rim and carries an inner flange 9 which fits into the groove 6 in the outer part 2.

The cover 10 has a substantially flat central portion and a cylindrical outer portion 12. The inner surface of the outer portion is provided with a female thread 13 so that the cover may be screwed onto the neck 3 of the container. In this embodiment the outer diameter of the cylinder 12 substantially equal to the external diameter of the container.

As may be seen in FIG. 2, the inner part 7 is inserted in the glass outerpart 1 during the assembly and its rim 8 comes to rest on the end 5 of the neck, while the plastic flange 9 comes into engagement with the groove 6 in the neck. The cover 10, as it is screwed onto the neck 3 presses the rim 8 of the plastic part 7 down on the ridge 5, so that the receptacle is tightly sealed.

Tests made by applicant's assignee have shown that it is possible to keep in the receptacle according to the invention cosmetic compositions which cannot be satisfactorily stored in plastic receptacles of the conventional types heretofore known.

In fact, while the cosmetic composition 14, shown in FIG. 1 only may, according to the invention, be kept in a thin plastic container which, taken by itself, would permit certain volatile constituents of the cosmetic material to escape, these contents are perfectly conserved because, while a small quantity of the volatile constituents is trapped in the space between the glass and plastic parts, these trapped constituents resist the escape of those volatile constituents which are still contained in the composition inside the plastic part. In other words, the glass part acts as a second, absolutely fluidtight container which makes it possible to conserve the cosmetic product inside the plastic container.

When the cover is made of a plastic material which will not permit the volatile constituents of the cosmetic composition to escape, one need only apply this cover to the end of the neck to insure perfect sealing of the container and good conservation of the product contained therein.

If such is not the case, the permeability of the cover may be overcome by covering its inner surface with a sheet of a metallic laminated compound. It should be noted that in this case, the continuous sealing results from the rim on the plastic part which is slightly deformable, so that it acts as a sealing ring between the top of the glass neck and the inner surface of the cover.

It will of course be appreciated that the foregoing embodiment has been described purely by way of illustration and may be modified as to detail without thereby departing from the basic principles of the invention.

In particular, the shapes of the various parts of the receptacle may be modified. For example, the inner part may be hemispherical in shape, thus reducing the volume contained therein, but facilitating the removal of its contents.

Suitables materials for use in making the plastic inner container are: polypropylene, polyethylene (high and low density) copolymer acrylonitril-butadiene-styrene, copolymer styrene-acrylonitril and superpolyamids.

Finally, the receptacle according to the invention may be used to package products other than cosmetic products. In particular, this receptacle is especially suitable for holding unguents of any kind, such as pharmaceutical and veterinary products.

I claim:

1. A receptacle comprising an outer container made of glass and provided with an externally grooved and threaded neck, an inner container made of noncollapsible plastic material comprising a concave portion seated in said outer container and spaced from the inner wall thereof, a rim which extends over said neck, and a lip depending from the outer edge of said rim which terminates in an inwardly projecting flange which fits into the groove in said neck, and a cover provided with a depending lip which has internal threads mating with the external threads on said neck.

2. A receptacle as claimed in claim 1 in which the top of said neck is provided with an annular rib against which the inner surface of said cover is pressed when said cover is screwed on said neck.

3. A receptacle as claimed in claim 1 comprising a sheet of impermeable material secured to the inner surface of said cover.

4. A receptacle as claimed in claim 1 in which the inner surface of said inner container is rounded at all points so as to be free of sharp corners.